May 27, 1958   H. M. E. PASQUET   2,836,071
APPARATUS FOR INDICATING A DIRECTION HAVING A DEFINITE RELATION
TO THE DIRECTION OF GRAVITY, AND IN PARTICULAR APPARATUS FOR
DETECTING THE TRUE VERTICAL ON BOARD OF A VEHICLE
Filed July 19, 1956   3 Sheets-Sheet 1

INVENTOR
HENRI M.E. PASQUET
BY Toulmin & Toulmin
ATTORNEY

May 27, 1958 H. M. E. PASQUET 2,836,071
APPARATUS FOR INDICATING A DIRECTION HAVING A DEFINITE RELATION
TO THE DIRECTION OF GRAVITY, AND IN PARTICULAR APPARATUS FOR
DETECTING THE TRUE VERTICAL ON BOARD OF A VEHICLE
Filed July 19, 1956 3 Sheets-Sheet 2

INVENTOR
HENRI M.E. PASQUET
BY *Taulmin & Taulmin*
ATTORNEY

INVENTOR
HENRI M.E. PASQUET
BY Taulmin & Taulmin
ATTORNEY

United States Patent Office 2,836,071
Patented May 27, 1958

2,836,071

APPARATUS FOR INDICATING A DIRECTION HAVING A DEFINITE RELATION TO THE DIRECTION OF GRAVITY, AND IN PARTICULAR APPARATUS FOR DETECTING THE TRUE VERTICAL ON BOARD OF A VEHICLE

Henri Marcel Edmond Pasquet, Neuilly-sur-Seine, France, assignor to Societe d'Applications Generales d'Electricite et de Mecanique, S. A. G. E. M., Paris, France, a French society Application July 19, 1956, Serial No. 598,823

Claims priority, application France July 29, 1955

10 Claims. (Cl. 74—5.47)

The present invention relates to all apparatus for indicating a direction having a definite relation to the direction of gravity.

My invention is more especially but not exclusively concerned with apparatus for indicating the true vertical on board of a vehicle, for instance a ship.

The chief object of this invention is to provide an apparatus of this kind which is better adapted to meet the requirements of practice than those known at the present time.

According to my invention, such an apparatus includes at least one gyroscope suspended at its center of gravity and an aperiodic vertical detector operatively connected with said gyroscope by means of at least one torque-motor capable of rotating the axis of rotation of said gyroscope about the center of gravity thereof so as to keep horizontal a reference line fixed with respect to the frame or casing of the gyroscope, said vertical detector having a time constant adjustable to a value higher than one fourth of that of the system constituted by the gyroscope and its torque-motor.

A preferred embodiment of the present invention will be hereinafter described with reference to the accompanying drawings given merely by way of example and in which.

Figure 7:
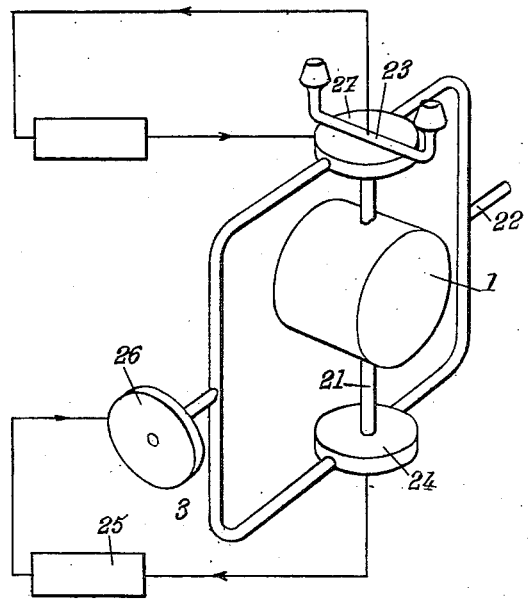
Figure 8:
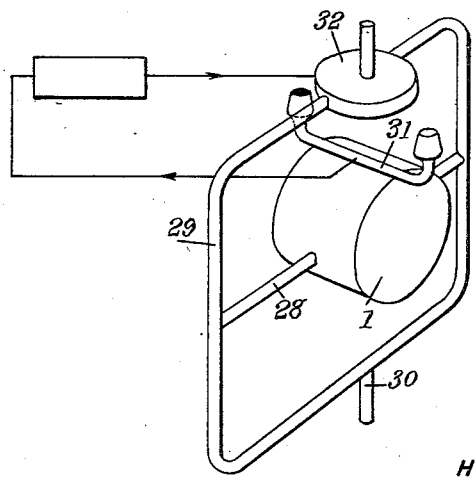

Figs. 7 and 8 diagrammatically show in perspective view a horizontal indicating gyroscope and a directional gyroscope, respectively, made according to my invention.

The vertical at a given place is defined as a direction of the gravity field at this place and the simplest way of determining this direction consists in making use of a plumb-line.

However, the direction indicated by a plumb-line is correct only if the point of suspension of this apparatus is fixed. As a matter of fact, due to its inertia, the mass of the plumb-line cannot follow instantaneously the movements imparted to the point of suspension. The pendulum constituted by the plumb-line starts oscillating and indicates a variable direction which depends not only upon the characteristics of the movement of the point of suspension but also upon the characteristics of the pendulum, in particular its period and the damping of its oscillations.

Now, it has been demonstrated by Max Schüler that any pendulum having a period of 84.4 minutes is not disturbed by any horizontal oscillation on the surface of earth, whatever be the accelerations undergone by its point of suspension, provided that this point is located on the surface of earth. It always remains in a position of equilibrium and constantly indicates the vertical.

It has been endeavoured to make pendulums the period of which is as close as possible to 84 minutes, because the quality of a pendulum, from the point of view of its lack of response to accelerations is the better as its period is closer to this value.

Unfortunately, the construction of a pendulum having a period of 84 minutes is extremely difficult. In order to obtain such a period, a simple pendulum should be of a length impossible to obtain and a composite pendulum should have a balancing and an absence of friction which are also impossible to obtain. As for bigyroscopic pendulums, of a period equal to 84 minutes, they are extremely expensive and their use as vertical indicators was not found entirely satisfactory.

Other approximative solutions have been suggested.

One of the most usual ones is constituted by what is called a "gyro-pendulum," that is to say a vertical axis gyroscope suspended at a point located above its center of gravity. But the conventional gyro-pendulum is objectionable in that, when it is moved away from its position of equilibrium, the trace of its axis on a horizontal plane describes a circle having its center at the trace of said axis in the position of equilibrium. As a matter of fact, this circle becomes a convergent spiral due to damping. The period of this circular movement may be of some tens of minutes, a value which is favorable from the point of view of the influence of accelerations but which is prohibitive due to the length of time elapsing before the axis of the gyro-pendulum is once more close enough to the vertical.

The serious drawback resulting from the circular movement of the ordinary gyro-pendulum has been obviated by the use of the so-called erector gyro-pendulum. This instrument is a vertical axis gyroscope suspended at its center of gravity and associated with a periodic vertical detector acting on the gyroscope by means of torque-motors mounted on its axes of suspension. This system is equivalent to an ordinary gyro-pendulum in which the pendular rectifying torque would be off-set by 90°, this off-setting being made possible by the electrical nature of the torques that are created. The circular movement of an ordinary gyro-pendulum then becomes a radial movement, which is very favorable when the apparatus is used as a vertical indicator. But, on the other hand, there is a serious drawback because this movement is aperiodic, which means that the axis of the gyroscope returns to its position of equilibrium only after a theoretically infinite time. It follows that, in order to obtain an acceptable apparatus, it is necessary to apply to the system a force returning it toward its position of equilibrium, this force having a relatively considerable value, that is to say a relatively short time constant (it should be well understood that the "time constant" of an aperiodic system working on the first order exponential law is the time at the end of which the displacement of the system from its position of equilibrium is reduced to its actual value multiplied by 0.3679). This time constant averages some tens of seconds, which is unfavorable from the point of view of the effect of accelerations.

As a matter of fact, if periodical accelerations of a period which is short as compared with the time constant of the system have a practically negligible perturbing effect (case of the rolling of a ship, for instance), this is no longer true in the case of long period accelerations (case of the gyration of a ship, for instance). It is then necessary, in order to achieve a good vertical indicator, to associate with the erector gyro-pendulum an acceleration correcting device, which generally introduces errors due to the difficulty of measuring accelerations on board of a vehicle in movement.

The essential object of the present invention is to obviate the above drawbacks.

Figure 1:
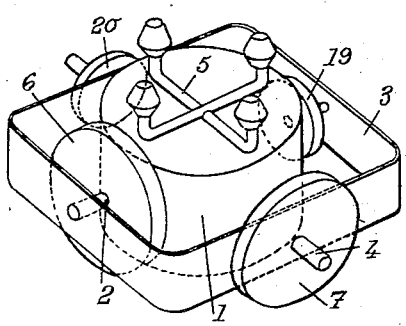
Fig. 1 is a diagrammatic perspective view of a gyroscope system according to my invention.

My invention, as diagrammatically illustrated by the embodiment of Fig. 1 is characterized as follows:

A gyroscope 1, having a substantially vertical axis, is suspended at its center of gravity, advantageously by means of a gimbal mounting including a first axle 2 connecting the frame or casing of the gyroscope rotor with a ring 3 and a second axle 4, at right angles to the first one, connecting said ring 3 with the support of the apparatus.

This gyroscope 1 cooperates with an aperiodic vertical detector 5, the time constant of which is adjustable within limits which will be hereinafter set forth.

The vertical detector device 5 and the gyroscope 1 are operatively connected together by at least one rectifying torque-motor mounted on one of the suspension axles of the gyroscope and which tends to impart to the axis thereof precession movements returning it to the vertical.

Means are provided for adjusting the time constant of the vertical detector 5 to a value higher than one fourth of the time constant of the whole of the gyroscope 1 and its rectifying torque-motor or motors.

For instance, in the arrangement above considered, I may provide two rectifying torque-motors 6 and 7 mounted respectively between the inner suspension axle 2, rigid with casing 1, and ring 3 and between the outer suspension axle 4, rigid with ring 3, and the support, said torque-motors being controlled by the vertical detector device 5 as it will be hereinafter specified.

It can be demonstrated that the combination of a gyroscope controlled by torque-motors (this system being inherently aperiodic) and of a vertical detector device (which is also aperiodic) constitutes a system the movement of which is no longer aperiodic but periodic and damped if the time constant of the vertical detector device complies with the above stated condition.

This makes it possible considerably to increase the period of the whole system while maintaining at an acceptable value the delay necessary for the return of the apparatus indicating means substantially to the position of equilibrium thereof.

Figure 2:
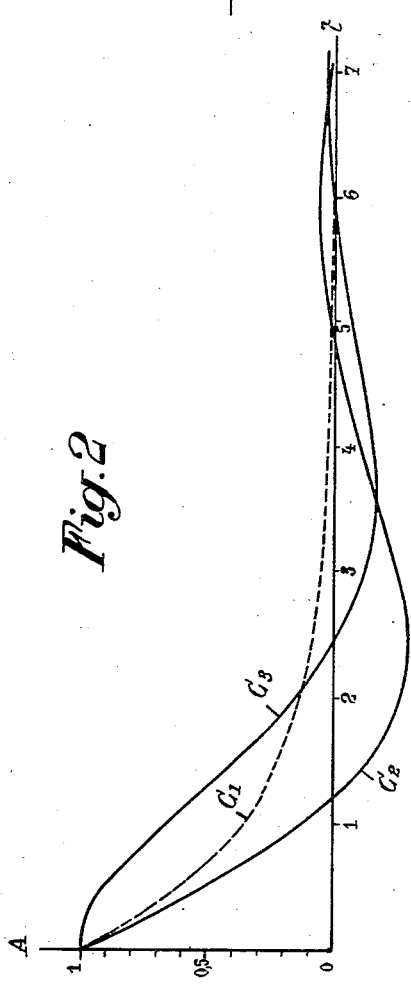
Fig. 2 shows curves illustrating the characteristics of operation of this system.

In order to illustrate this, on Fig. 2 (where the times $t$ are plotted in abscissas and the amplitudes A of displacements of the gyroscope axis, in ordinates) curve $C_1$, in dotted lines, shows the movement of a conventional erector gyro-pendulum (aperiodic system) having a time constant of 60 seconds and the curves $C_2$ and $C_3$ in thread lines show two cases of the possible movement of a vertical indicating gyroscope having a period of 7.3 minutes, made according to the invention.

It can be demonstrated by calculation that the factor of reduction of the amplitudes of a forced oscillation is:

For a conventional erector gyro-pendulum having a time constant equal to 60 seconds, about 1/60 for a forced oscillation having a period of 6 seconds and about 1/3.3 for a forced oscillation having a period of 2 minutes.

And for a vertical indicating gyroscope according to the invention having a period of 7.3 minutes, about 1/3600 for a forced oscillation having a period of 6 seconds and about 1/9.5 for a forced oscillation having a period of 2 minutes.

It will be seen that the invention permits of considerably improving the qualities of the system with respect to perturbing oscillations.

Of course, the numerical values above indicated constitute only indicative examples.

I will now describe several specific embodiments of the apparatus according to my invention.

The gyroscope 1 may be of any conventional type. For instance, it includes a rotor driven by a three-phase asynchronous motor the squirrel cage of which belongs to said rotor.

As for the rectifying torque-motors 6 and 7, they are advantageously made to include the following elements:

(a) On the one hand, an inductor or wound stator similar to that of a two-phase asynchronous motor;

(b) On the other hand, an armature or rotor constituted by a squirrel cage.

The time constant of gyroscope 1 fitted with its rectifying torque-motors 6 and 7 is proportional to the ratio of the kinematic movement of said gyroscope to the torque exerted by one of said torque-motors. It will be understood that it is therefore possible, by a suitable adjustment of the electric circuit which feeds current to torque-motors 6 and 7, to give said time constant a value ranging from about one half of a minute to several minutes.

Concerning now the vertical detector device 5, it is advantageously constituted, as diagrammatically shown by Fig. 1, by liquid levels crossed with respect to each other, and respectively parallel to the suspension axles 2 and 4 of gyroscope 1, said liquid levels being carried by the frame or casing of said gyroscope.

Figure 3:
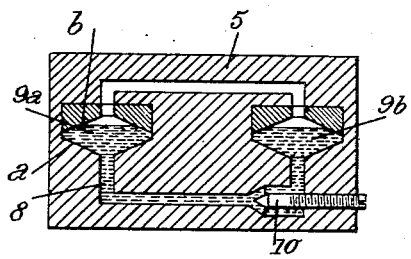
Fig. 3 is an axial sectional view of an electrolytic level instrument included in said gyroscope system.
Figure 4:
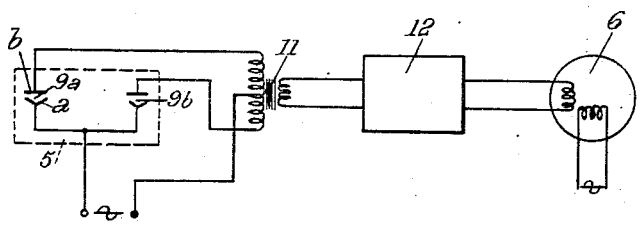
Fig. 4 shows the electric lay-out used in connection with said level instrument.

Advantageously, each of said liquid levels and the electric circuit it controls are made as shown by Figs. 3 and 4.

According to this arrangement, each level includes a body 5 provided with a conduit 8 having the general shape of a U each of the branches of which opens into a biconical recess $9_a$, $9_b$ respectively, the lower portion $a$ of which is metallic and constitutes the body of the level, and the upper portion $b$ of which is constituted by an electrically insulated metal cover. The electrolytic liquid located in each of said recesses has its free surface in a plane located about at mid-height of each upper portion $b$.

The lower branch of conduit 8 contains an adjustable needle-valve 10 which makes it possible to adjust the section through which liquid can flow in said conduit and thus to brake the liquid flow sufficiently to make the movement of liquid between the two recesses $9_a$ and $9_b$ wholly aperiodic. The time constant of this movement may be adjusted by means of needle-valve 10 so as to have a value higher than one fourth of the time constant of the whole of the gyroscope and of its rectifying torque-motors.

Each of said levels is branched on the feed circuit of a differential transformer 11, the secondary of which therefore supplies, across its terminals a voltage which measures the difference between the liquid levels in the two recesses respectively. This difference is interrelated according a definite law with the possible inclination of the gyroscope axis, the two levels thus defining in an accurate fashion the direction of the axis of gyroscope 1.

The differential transformers 11 connected with the circuits of the two levels are arranged to control amplifiers 12 which feed current respectively to torque-motor 6 and torque-motor 7. Of course, the connections are arranged in such manner that the level disposed along one of the axles 2 or 4 controls the torque-motor 7 or 6 mounted on the other axle, this control being exerted in such fashion that the torque-motor that is operated causes a precession movement of gyroscope 1 toward its position of equilibrium for which its axis is vertical.

The torque-motors 6 and 7 may be controlled merely by the vertical detector device 5, as above stated. But it seems preferable further to provide the apparatus with a correcting device taking into account the effect produced by the rotation of earth and/or a device for correcting the horizontal accelerations to which may be subjected the moving body (in the present case a ship) on which the apparatus is mounted.

Concerning the first mentioned of these correcting devices, it should be reminded that any gyroscope is subjected to the so-called "fictitious magnetizing" due to the rotation of earth, a phenomenon the effect of which is to move through a small angle in the westward direction the position of equilibrium of the gyroscope axis.

In order to eliminate this deflection from the true vertical, I apply to the torque-motors 6 and 7 correcting voltages which may be adjusted in accordance with the direction in which the ship is heading so as to make allowance for the fact that said torque-motors are fixed with respect to the ship.

Figure 5:
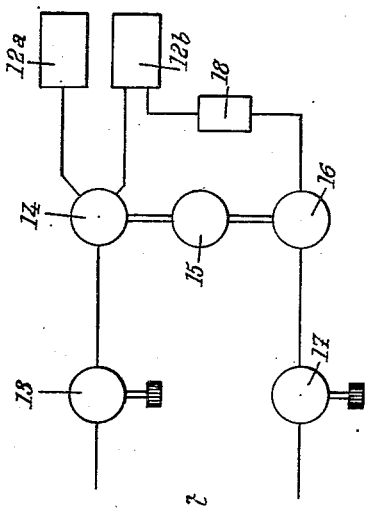
Figs. 5 and 6 show the electrical lay-out of correcting and angle transmitting devices included in the gyroscope system.

For this purpose, as shown by Fig. 5, a voltage supplied by a latitude potentiometer 13, and depending upon the latitude and the characteristics of gyroscope 1, is applied to a sine-cosine potentiometer 14 made responsive to variations of the ship's course by a course receiving motor 15. The two outputs of said potentiometer 14 are connected with feed amplifiers 12$_a$ and 12$_b$ of the torque-motors 6 and 7, the latter thus receiving correcting voltages which compensate for the effect of the rotation of the earth.

Concerning the device for correcting the effects of horizontal accelerations, it should be reminded that any acceleration of the ship, either rectilinear or gyratory, has for its effect to alter the indications of the electrolytic levels 5 which always tend to adapt themselves to the apparent vertical.

In the case of periodic accelerations of short period due, for instance, to rolling and pitching of the ship, the liquid of the electrolytic levels practically does not move due to the fact that the tube which connects the branches of the levels is throttled by the needle-valve provided therein. The error which may result from the very small reciprocating flow of liquid is negligible and there is no need to compensate for it.

On the contrary, in case of gyratory accelerations, it is necessary to apply to the amplifier 12$_b$ of the torque-motor of the transverse axle a correcting voltage proportional to the acceleration, that is to say to the deflection of the apparent vertical. A gyratory acceleration correcting device may be made as illustrated by Fig. 5.

The motor 15 which receives the indication of the ship heading drives a tachometric generator 16 the inductor of which is fed with current through a speed potentiometer 17 under a voltage proportional to the speed of the ship, said generator 16 creating a voltage proportional to the deflection of the apparent vertical caused by the gyration of the ship.

This voltage is caused to act upon the feed amplifier 12$_b$ of the transverse axle torque-motor through a correcting network 18 arranged so as to give said voltage a time constant equal to that of the transverse electrolytic level.

If it were desired to take into account the rectilinear acceleration of the ship, it would be necessary to apply to the longitudinal axle torque-motor a correcting voltage proportional to the longitudinal accelerations, which might be obtained by making use of a potentiometer controlled in accordance with the speed of the ship and supplying a voltage proportional to said speed. This voltage should then pass through a derivating network further giving it a time constant equal to that of the longitudinal electrolytic level, the voltage thus corrected being then applied to the amplifier 12$_a$ of the longitudinal axis torque-motor.

My apparatus further includes angle transmitting devices capable of detecting the inclination angles of the gyroscope about its suspension axles, that is to say the rolling and pitching angles if it is supposed that the gyroscope axles extend respectively in the longitudinal direction and in the transverse direction of the ship.

Such angle detecting devices may be constituted by two potentiometers 19 and 20 having circular tracks mounted respectively on each of suspension axles 2 and 4 of gyroscope 1.

Figure 6:
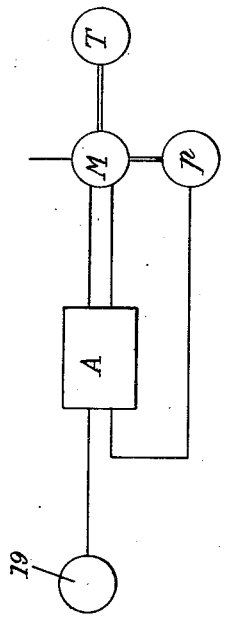

I may, as diagrammatically shown on Fig. 6, concerning the measurement potentiometer 19, make use of the indications of said potentiometers for telecontrolling a stabilized platform.

It suffices, for this purpose, to transmit the indications of potentiometer 19 through an amplifier A to a motor M (including a control potentiometer $p$) which drives a synchronous transmission T controlling one of the degrees of freedom of the platform.

A modification of the above described embodiment consists:

In having the suspension system of gyroscope 1 supported by a platform itself suspended on a gimbal ring the axles of which are parallel to the suspension axles of said gyroscope;

And in replacing the measurement potentiometers 19 and 20 by angular deflection detectors controlling the manner in which the suspended platform is held so as to make said platform exactly perpendicular to the axis of the gyroscope, the controlling motors further driving the synchronous transmitters of the rolling and pitching angles.

This modification gives the following possibilities:

On the one hand, to keep the axles of torque-motors 6 and 7 approximately horizontal, which practically eliminates the vertical component of the torques that are created;

On the other hand, to reduce friction about the suspension axles of the gyroscope owing to the fact that the angle measuring potentiometers are dispensed with;

And, additionally, to improve the accuracy of transmission of the rolling and pitching angles.

The above stated modification permits of mounting the vertical detector device no longer on the casing of gyroscope 1 but on the controlled platform which is constantly kept perpendicular to the axis of gyroscope by the angular deflection detectors and the motors controlled by said detectors.

In these conditions, it is possible to dispose the two vertical detector levels respectively in the north-south direction and in the east-west direction.

The voltages collected across the terminals of the differential transformers disposed on the circuit of the levels may be applied to a "resolver" which is also made responsive to variations of the course and which supplies the suitable voltages corresponding to the direction of the axes of the torque-motors, these voltages controlling, as in the preceding cases, the feed amplifiers of the torque-motors 6 and 7.

This last mentioned solution permits of correcting the effect of the rotation of earth by a mere offsetting of the east-west level with respect to the platform and further considerably to reduce the errors due to accelerations by a suitable choice of the time constants of the gyroscope and of the electrolytic levels (value averaging from one to some minutes) and in this case the acceleration correctors may be dispensed with.

In what precedes it has been shown how the main feature of the invention makes it possible to determine the vertical about one point or, to be more accurate, about two intersecting axes. But the invention might also be applied to the determination of the vertical or of one horizontal about one axis and two examples of the last mentioned application will now be described.

Fig. 7 relates to the determination of the horizontal in a plane perpendicular to the axis of suspension of the apparatus, which suspension axis will be supposed to be horizontal in order to facilitate explanations.

According to this construction, the casing of gyroscope 1, the axis of which is directed horizontally, is suspended to a gimbal ring 3 through a vertical axle 21. The gimbal ring 3 is suspended to a support by a horizontal axle 22. The ring 3 carries a vertical detector 23, for instance of the electrolytic kind, said vertical detector being mounted perpendicular to the outer suspension axle 22 of ring 3.

In said ring 3 there is mounted a rotation detector 24 capable of measuring the rotation angles of the casing of gyroscope 1 about the inner axle 21, said angle detector 24 controlling through an amplifier 25, a torque-motor 26 mounted on the outer suspension axle 22.

The vertical detector 23 controls a rectifying torque-motor 27 mounted on the inner suspension axle 21.

It can be demonstrated that in these conditions, whatever be the position of the suspension axle 22, the gimbal ring is given a periodic and damped movement about this axle, its position of equilibrium being vertical and its oscillatory movement being possibly of long period if the relative characteristics of the vertical detector and of the torque-motor 27 are suitably chosen.

The second example illustrated by Fig. 8 relates to an apparatus for supplying any fixed azimuthal direction, this result being obtainable by keeping the axis of the gyroscope horizontal.

For this purpose, the casing of gyroscope 1 is journalled by means of a horizontal axle 28 in a gimbal ring 29 suspended through an external axle 30 (supposed to be vertical) in the support of the apparatus.

The casing of gyroscope 1 carries a vertical detector 31, for instance of the electrolytic level type, mounted perpendicular to the inner suspension axle 28, said vertical detector controlling, through an amplifier, a rectifying torque-motor 32 mounted on the suspension axle 30.

It can be demonstrated that with such an arrangement, whatever be the position of the suspension axle 30, the casing of the gyroscope is given a periodical and damped movement about this axle, its position of equilibrium being horizontal and its oscillatory movement having possibly a long period if the relative characteristics of the vertical detector 31 and of the rectifying torque-motor 32 are suitably chosen.

This apparatus makes it possible to keep the gyroscope axis horizontal so that said gyroscope can be used as a directional gyro.

Of course, the two apparatuses shown on Figs. 7 and 8 may further include auxiliary devices such, in particular, as those above described with reference to the first embodiment of the invention. In particular, they might include devices for correcting the effect of the rotation of earth, the effect of the speed of the vehicle, acceleration correctors, or again so-called "cut-out" devices switching off the rectifying torque-motors when the horizonal acceleration exceeds a predetermined value.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus of the type described which comprises, in combination, a gyroscope, said gyroscope including a frame and a rotor journalled in said frame, a support, means interposed between said frame and said support for freely suspending said frame to said support about the center of gravity of said rotor, torque-motor means inserted in said suspending means capable, when energized, of imparting a precession movement to said frame, an aperiodic vertical detector operatively connected with said frame, and means operative by said detector, for energizing said torque-motor means in a manner to keep horizontal a reference line fixed with respect to said frame, said vertical detector having a time constant adjustable to a value higher than one fourth of the time of response of the system constituted by said gyroscope and said torque-motor.

2. An apparatus of the type described which comprises, in combination, a gyroscope, said gyroscope including a frame and a rotor journalled in said frame, a support, means interposed between said frame and said support for freely suspending said frame to said support about the center of gravity of said rotor, torque-motor means inserted in said suspending means capable, when energized, of imparting a precession movement to said frame, an aperiodic vertical detector mounted on said frame, and means operative by said detector for energizing said torque-motor means in a manner to keep horizontal a reference line fixed with respect to said frame, said vertical detector having a time constant adjustable to a value higher than one fourth of the time of response of the system constituted by said gyroscope and said torque-motor.

3. An apparatus of the type described which comprises, in combination, a vertical axis gyroscope, said gyroscope including a frame and a rotor journalled in said frame, a support, means interposed between said frame and said support for freely suspending said frame to said support about the center of gravity of said rotor, torque-motor means inserted in said suspending means capable, when energized, of imparting a precession movement to said frame, an aperiodic vertical detector mounted on said frame to detect deflections of the axis of rotation of said rotor from the direction of the true vertical, and means operative by said detector for energizing said torque-motor means in response to such deflections in a manner to tend to keep the axis of said rotor vertical, said vertical detector having a time constant adjustable to a value higher than one fourth of the time of response of the system constituted by said gyroscope and said torque-motor.

4. An apparatus of the type described which comprises, in combination, a vertical axis gyroscope, said gyroscope including a frame and a rotor journalled in said frame, a support, a gimbal ring pivoted to said support about an axis, said gyroscope frame being pivoted to said gimbal ring about an axis at right angles to said last mentioned axis and passing through the center of gravity of said rotor, a torque-motor interposed between said support and said gimbal ring, a torque-motor interposed between said gimbal ring and said gyroscope frame, an aperiodic vertical detector mounted on said frame to detect deflections of the axis of rotation of said rotor from the direction of the true vertical, and means operative by said detector for energizing said torque-motors in response to such deflections in a manner to tend to keep the axis of said rotor vertical, said vertical detector having a time constant adjustable to a value higher than one fourth of the time of response of the system constituted by said gyroscope and said torque-motor.

5. An apparatus of the type described which comprises, in combination, a vertical axis gyroscope, said gyroscope including a frame and a rotor journalled in said frame, a support, a gimbal ring pivoted to said support about an axis, said gyroscope frame being pivoted to said gimbal ring about an axis at right angles to said last mentioned axis and passing through the center of gravity of said rotor, a torque-motor interposed between said support and said gimbal ring, a torque-motor interposed between said gimbal ring and said gyroscope frame, an aperiodic vertical detector mounted on said frame to detect deflections of the axis of rotation of said rotor from the direction of the true vertical, and means operative by said detector for energizing said torque-motors in response to such deflections in a manner to tend to keep the axis of said rotor vertical, said vertical detector having a time constant adjustable to a value higher than one fourth of the time of response of the system constituted by said gyroscope and said torque-motor, said vertical detector including two liquid levels disposed in crossed relation to each other, each of said levels being parallel to one of said pivot axes between said gimbal ring on the one hand and said support and said gyroscope frame on the other hand.

6. An apparatus according to claim 5 in which each liquid level includes a body in which is provided a U-shaped conduit and two biconical recesses into which the top ends of the vertical branches of said conduit open, the lower portion of each of said recesses being metallic, the upper portion of each of said recesses consisting of an electrically insulated metal part, an electrolytic liquid being provided in said conduit and said recesses up to a level located substantially half way between the top and the bottom of said upper metal part, and an adjustable needle-valve provided in the horizontal portion of the U-shaped conduit for adjusting the section through said conduit and thus braking the flow of liquid so as to make the movement of said liquid between said two recesses aperiodic, and two differential transformers, each of said transformers having two primary circuit elements each passing through the middle point of the bottom part of said U conduit and one of said upper metal parts, said two primary circuit elements being in opposition, the secondary circuits of said transformers being connected with said torque-motors respectively.

7. An apparatus according to claim 1 further including a device for additionally controlling said torque-motor means, said device being responsive to the effect of the rotation of earth.

8. An apparatus according to claim 1 further including a device for additionally controlling said torque-motor means, said device being responsive to the effect of the horizontal accelerations undergone by the vehicle on which the apparatus is mounted.

9. An apparatus according to claim 1 further comprising angle transmitting devices capable of detecting the angles of inclination of the gyroscope about its suspension axles.

10. An apparatus of the type described which comprises, in combination, a horizontal axis gyroscope, said gyroscope including a frame and a rotor journalled in said frame, a support, a gimbal ring pivoted to said support about a horizontal axis, said gyroscope frame being pivoted to said gimbal ring about a vertical axis passing through the center of gravity of said rotor, a torque-motor interposed between said support and said gimbal ring, a torque-motor interposed between said gimbal ring and said gyroscope frame, an aperiodic vertical detector carried by said gimbal ring, a rotation detector carried by said gyroscope frame and responsive to rotations of said frame about said vertical axis, means operative by said vertical detector for energizing said second mentioned torque-motor, and means operative by said rotation detector for energizing said first mentioned torque-motor, said vertical detector having a time constant adjustable to a value higher than one fourth of the time of response of the system constituted by said gyroscope and said torque-motor.

References Cited in the file of this patent

UNITED STATES PATENTS

| | | |
|---|---|---|
| 1,763,806 | Methvin | June 17, 1930 |
| 1,805,854 | Sperry | May 19, 1931 |
| 2,257,730 | Braddon | Oct. 7, 1941 |
| 2,365,727 | Pike | Dec. 26, 1944 |